(12) United States Patent
Stergioudis et al.

(10) Patent No.: US 11,595,415 B2
(45) Date of Patent: Feb. 28, 2023

(54) ROOT CAUSE ANALYSIS IN MULTIVARIATE UNSUPERVISED ANOMALY DETECTION

(71) Applicant: Citrix Systems, Inc., Fort Lauderdale, FL (US)

(72) Inventors: Asterios Stergioudis, Salonika (GR); Aikaterini Kalou, Patras (GR); Georgios Papaloukopoulos, Patras (GR)

( * ) Notice: Subject to any disclaimer, the term of this patent is extended or adjusted under 35 U.S.C. 154(b) by 517 days.

(21) Appl. No.: 16/733,324

(22) Filed: Jan. 3, 2020

(65) Prior Publication Data

US 2021/0136098 A1    May 6, 2021

Related U.S. Application Data

(63) Continuation of application No. PCT/GR2019/000073, filed on Oct. 30, 2019.

(51) Int. Cl.
*H04L 9/40* (2022.01)
*G06N 20/00* (2019.01)
*G06F 11/07* (2006.01)
*G06K 9/62* (2022.01)

(52) U.S. Cl.
CPC ........ *H04L 63/1425* (2013.01); *G06F 11/079* (2013.01); *G06K 9/6267* (2013.01); *G06N 20/00* (2019.01)

(58) Field of Classification Search
CPC ... H04L 63/1425; G06N 20/00; G06F 11/079; G06K 9/6267
See application file for complete search history.

(56) References Cited

U.S. PATENT DOCUMENTS

| | | | | |
|---|---|---|---|---|
| 10,045,218 | B1* | 8/2018 | Stapleton | H04M 7/0078 |
| 11,204,847 | B2* | 12/2021 | Nie | G06N 20/20 |
| 11,244,043 | B2* | 2/2022 | Marwah | H04L 63/1425 |
| 11,262,742 | B2* | 3/2022 | Srinivasamurthy | G06K 9/6271 |
| 11,347,718 | B2* | 5/2022 | MacManus | G06N 5/04 |

(Continued)

OTHER PUBLICATIONS

Chen, Jianbo, et al: "L-Shapley and C-Shapley: Efficient Model Interpretation for Structured Data", arxiv.org, Cornell University Library, 201 Olin Library Cornell University Ithaca, NY 14853, Aug. 8, 2018 (Aug. 8, 2018), XP081254851.

(Continued)

*Primary Examiner* — Joseph P Hirl
*Assistant Examiner* — Stephen T Gundry (57) ABSTRACT

Described embodiments provide systems and methods for anomaly detection and root cause analysis. A root cause analyzer receives a plurality of data samples input to an anomaly detection engine, and a corresponding plurality of anomaly labels output from the anomaly detection engine. The root cause analyzer trains a classification model using the plurality of data samples and the corresponding plurality of anomaly labels. The root cause analyzer determines, (Continued)

using the trained classification model and the plurality of data samples, relative contributions of anomalous features in a data sample of the plurality of data samples, to a prediction that the data sample is anomalous. The root cause analyzer provides the relative contributions of anomalous features to a device, to determine an action in response to the prediction that the data sample is anomalous.

20 Claims, 5 Drawing Sheets

(56) References Cited

U.S. PATENT DOCUMENTS

| | | | |
|---|---|---|---|
| 2018/0270261 A1 | 9/2018 | Pande et al. | |
| 2019/0205234 A1* | 7/2019 | Moriyama | G06N 20/20 |
| 2020/0311603 A1* | 10/2020 | Qiu | G06N 5/04 |
| 2020/0334228 A1* | 10/2020 | Matyska | G06Q 30/0185 |
| 2020/0342329 A1* | 10/2020 | Kain | G06N 3/04 |
| 2020/0351283 A1* | 11/2020 | Salunke | H04L 63/1425 |
| 2020/0364561 A1* | 11/2020 | Ananthanarayanan | H04L 63/1425 |
| 2020/0379454 A1* | 12/2020 | Trinh | G06N 3/088 |
| 2020/0379868 A1* | 12/2020 | Dherange | G06F 11/3438 |
| 2020/0382536 A1* | 12/2020 | Dherange | H04L 63/1425 |
| 2020/0387797 A1* | 12/2020 | Ryan | G06F 11/3006 |
| 2021/0026747 A1* | 1/2021 | Garion | G06F 11/3476 |
| 2021/0027167 A1* | 1/2021 | Goloubew | G06F 21/562 |
| 2021/0034994 A1* | 2/2021 | Stocker | G06N 5/04 |
| 2021/0056430 A1* | 2/2021 | Wu | G06N 3/0445 |
| 2021/0064597 A1* | 3/2021 | MacManus | G06F 16/215 |
| 2021/0064922 A1* | 3/2021 | MacManus | G06K 9/6284 |
| 2021/0103580 A1* | 4/2021 | Schierz | G06F 16/2365 |

OTHER PUBLICATIONS

International Search Report and Written Opinion for International Application No. PCT/GR2019/000073, dated Aug. 12, 2020.
Luketina, Jelena, et al: "Scalable Gradient-Based Tuning of Continuous Regularization Hyperparameters", Nov. 20, 2015 (Nov. 20, 2015), XP055719344, Retrieved from the Internet: URL: http://proceedings. mlr.press/v48/luketina 16.pdf.
Lundberg, Scott M, et al: "Consistent feature attribution for tree ensembles", arxiv.org, Cornell University Library, 201 Olin Library Cornell University Ithaca, NY 14853, Jun. 19, 2017 (Jun. 19, 2017)XP081317930.
Bergdtra, James, et al., Algorithms for Hyper-Parameter Optimization, URL: https://papers.nips.cc/paper/4443-algorithms-for-hyper-parameter-optimization.pdf.
Lundberg, Scott M., et al., A Unified Approach to Interpreting Model Predictions, Advances in Neural Information Processing Systems 30 (Neural Information Processing Systems 2017 Conference), URL: http://papers.nips.cc/book/advances-in-neural-information-processing-systems-30-2017.
Lundberg, Scott M., et al., Consistent Individualized Feature Attribution for Tree Ensembles, University of Washington, Mar. 7, 2019, URL: https://arxiv.org/abs/1802.03888.
International Preliminary Report on Patentability for PCT Appl. No. PCT/GR2019/000073 dated May 12, 2022.

* cited by examiner

| Data Sample | Feature 1 | Feature 2 | ... | Feature n-1 | Feature n |
|---|---|---|---|---|---|
| Data Sample 1 | 4 | 8 | ... | 15 | 10 |
| Data Sample 2 | 9 | 104 | ... | 35 | 8 |
| ... | ... | ... | ... | ... | ... |
| Data Sample n-1 | 8 | 6 | ... | 10 | 5 |
| Data Sample n | -16 | 8 | ... | 12 | 9 |

FIG. 3

| Data Sample | Feature 1 | Feature 2 | ... | Feature n-1 | Feature n | Anomaly Labels |
|---|---|---|---|---|---|---|
| Data Sample 1 | 4 | 8 | ... | 15 | 10 | No |
| Data Sample 2 | 9 | 104 | ... | 35 | 8 | Yes |
| ... | ... | ... | ... | ... | ... | |
| Data Sample n-1 | 8 | 6 | ... | 10 | 5 | No |
| Data Sample n | -16 | 8 | ... | 12 | 9 | Yes |

FIG. 4

| Data Sample | Contribution Score 1 | Contribution Score 2 | ... | Contribution Score n-1 | Contribution Score n | Anomaly Labels |
|---|---|---|---|---|---|---|
| Data Sample 1 | -0.3 | -0.6 | ... | -0.2 | -1.4 | No |
| Data Sample 2 | -0.5 | 9.3 | ... | 5.8 | -1.2 | Yes |
| ... | ... | ... | ... | ... | ... | |
| Data Sample n-1 | -1.7 | -0.8 | ... | -1.0 | -0.2 | No |
| Data Sample n | 7.2 | -0.6 | ... | -1.2 | -0.1 | Yes |

ROOT CAUSE ANALYSIS IN MULTIVARIATE UNSUPERVISED ANOMALY DETECTION

CROSS-REFERENCE TO RELATED APPLICATION

This application is a continuation of International Patent Application No. PCT/GR2019/000073, titled "ROOT CAUSE ANALYSIS IN MULTIVARIATE UNSUPERVISED ANOMALY DETECTION," and filed on Oct. 30, 2019, the contents of which are incorporated herein by reference in its entirety.

FIELD OF THE DISCLOSURE

The present application generally relates to root cause analysis, including but not limited to systems and methods for root cause analysis for multivariate unsupervised anomaly detection.

BACKGROUND

In a computing environment, various computing devices may regularly perform various tasks. Such tasks may be monitored by an administrator through software agents, interception of network traffic and other means. The network administrator may collect and analyze data corresponding to tasks performed by computing devices on a network.

SUMMARY

This Summary is provided to introduce a selection of concepts in a simplified form that are further described below in the Detailed Description. This Summary is not intended to identify key features or essential features, nor is it intended to limit the scope of the claims included herewith.

The following disclosure is directed to systems and methods for anomaly detection and root cause analysis. Specifically, the systems and methods described herein are configured to determine the root cause(s) of anomalous data sample(s) identified by an unsupervised multivariate detection system. The systems and methods described herein are configured to rank such root cause(s) based on their relative importance(s). While described herein in the context of User and Entity Behavior Analytics (UEBA), the systems and methods described herein may be applied across various other applications of anomaly detection.

UEBA may be or include the process of collecting and analyzing data regarding user or entity behavior, and applying machine learning and/or statistical analysis (mainly, unsupervised anomaly detection techniques) to detect anomalies that could indicate potential threats, risks or other scenarios. The machine learning and/or statistical analysis may detect anomalies by identifying unusual, inconsistent, outlier, or other inconsistent instances in which data does not conform to expected data.

Some implementations of UEBA systems may leverage univariate anomaly detection algorithms. In such implementations, the univariate anomaly detection algorithms can analyze each metric or feature of a data sample independently from the rest of the metrics. In this regard, the univariate anomaly detection algorithms detect anomalous observations separately for each metric or feature without considering possible correlations between other metric(s) or feature(s). The detected anomalous observations are then combined post hoc using a heuristic approach to produce, detect, or otherwise identify "multivariate" anomalies. However, such univariate approach has significant limitations, as such an approach considers each feature separately, as opposed to identifying anomalies where two (or more) features, in combination, are anomalous (e.g., a multivariate anomaly).

One reason a UEBA system may implement a univariate approach, as opposed to leveraging unsupervised multivariate anomaly detection techniques, is that the simplistic combination of the individual anomalies makes it trivial to interpret the "multivariate" anomalies. Thus, such implementations rely on pinpointing individual features in a data sample that were anomalous and which individual features were not anomalous, rather than viewing the totality of features. While such implementations may be computationally easier than a multivariate approach, such implementations have a cost in decreased accuracy in identifying multivariate anomalies. In some embodiments, as discussed herein, anomaly detection systems may leverage learning techniques (such as artificial intelligence, machine learning, deep learning, neural networks, etc.) to achieve better performance in anomaly detection. These techniques may implement a multivariate approach whereby multiple input features of a dataset are analyzed in parallel to detect anomalous observations. While the anomaly detection systems (e.g., which implement learning techniques) may achieve better performance than univariate anomaly detection systems, they may pose difficulties in root cause analysis (RCA). In some embodiments, the anomaly detection system may pose difficulties in RCA because, for instance, the system may consider multiple input features in parallel, the model (or combination of models) may not provide any intrinsic indications regarding the underlying reasons that a certain observation was regarded as anomalous or not, and the internals of the algorithms themselves may be complicated and such models are often likened to "black-box" solutions.

In one aspect, this disclosure is directed to a method. The method may include receiving, by a root cause analyzer, a plurality of data samples input to an anomaly detection engine, and a corresponding plurality of anomaly labels output from the anomaly detection engine. The method may include training, by the root cause analyzer, a classification model using the plurality of data samples and the corresponding plurality of anomaly labels. The method may include determining, by the root cause analyzer using the trained classification model and the plurality of data samples, relative contributions of anomalous features in a data sample of the plurality of data samples, to a prediction that the data sample is anomalous. The method may include providing, by the root cause analyzer, the relative contributions of anomalous features to a device, to determine an action in response to the prediction that the data sample is anomalous.

In some embodiments, the anomaly detection engine performs multivariate unsupervised anomaly detection to output the plurality of anomaly labels. In some embodiments, the plurality of anomaly labels includes binary labels or scores that are transformable to binary labels. In some embodiments, each of the plurality of anomaly labels is indicative of whether a corresponding data sample from the plurality of data samples is anomalous. In some embodiments, the method further includes predicting, by the root cause analyzer using the trained classification model and the plurality of data samples, that the data sample is anomalous.

In some embodiments, the method includes predicting, using supervised anomaly detection, that the data sample is anomalous.

In some embodiments, a prediction that the data sample is anomalous is attributable to a score of an anomalous feature in the data sample. In some embodiments, the data sample includes a multivariate anomaly attributable to the anomalous features indicated by the generated scores. In some embodiments, the method includes using a shapely additive explanations algorithm, the trained classification model and the plurality of data samples, to generate the scores indicative of the anomalous features in the data sample. In some embodiments, the method includes tuning hyper-parameters of the classification model prior to training the classification model using the plurality of data samples and the plurality of anomaly labels.

In another aspect, this disclosure is directed to a device. The device includes memory configured to store a plurality of data samples. The memory is further configured to provide the plurality of data samples to an anomaly detection engine. The device further includes at least one processor configured to implement a root cause analyzer to receive the plurality of data samples, and a corresponding plurality of anomaly labels output from the anomaly detection engine. The root cause analyzer is further configured to train a classification model using the plurality of data samples and the corresponding plurality of anomaly labels. The root cause analyzer is further configured to determine, using the trained classification model and the plurality of data samples, relative contributions of anomalous features in a data sample of the plurality of data samples, to a prediction that the data sample is anomalous. The root cause analyzer is further configured to provide the relative contributions of anomalous features to a device, to determine an action in response to the prediction that the data sample is anomalous.

In some embodiments, the anomaly detection engine is configured to perform multivariate unsupervised anomaly detection to output the plurality of anomaly labels. In some embodiments, the plurality of anomaly labels include binary labels or scores that are transformable to binary labels. In some embodiments, each of the plurality of anomaly labels is indicative of whether a corresponding data sample from the plurality of data samples is anomalous. In some embodiments, the root cause analyzer is configured to predict, using the trained classification model and the plurality of data samples, that the data sample is anomalous. In some embodiments, the root cause analyzer is configured to predict, using supervised anomaly detection, that the data sample is anomalous. In some embodiments, a prediction that the data sample is anomalous is attributable to a score of an anomalous feature in the data sample. In some embodiments, the data sample includes a multivariate anomaly attributable to the anomalous features indicated by the generated scores. In some embodiments, the root cause analyzer is configured to generate the scores indicative of the anomalous features in the data sample, using a shapely additive explanations algorithm, the trained classification model and the plurality of data samples.

In still another aspect, this disclosure is directed to a non-transitory computer readable medium storing program instructions for causing one or more processors to receive a plurality of data samples input to an anomaly detection engine, and a corresponding plurality of anomaly labels output from the anomaly detection engine. The instructions cause the one or more processors to train a classification model using the plurality of data samples and the corresponding plurality of anomaly labels. The instructions cause the one or more processors to generate, using the trained classification model and the plurality of data samples, relative contributions of anomalous features in a data sample of the plurality of data samples to a prediction that the data sample is anomalous. The instructions cause the one or more processors to provide the relative contributions of anomalous features to a device, to determine an action in response to the prediction that the data sample is anomalous.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

DETAILED DESCRIPTION

For purposes of reading the description of the various embodiments below, the following descriptions of the sections of the specification and their respective contents may be helpful:

Section A describes a computing environment which may be useful for practicing embodiments described herein.

Section B describes systems and methods for anomaly detection and root cause analysis.

A. Computing Environment

Prior to discussing the specifics of embodiments of the systems and methods detailed herein in Section B, it may be helpful to discuss the computing environments in which such embodiments may be deployed.

Figure 1:
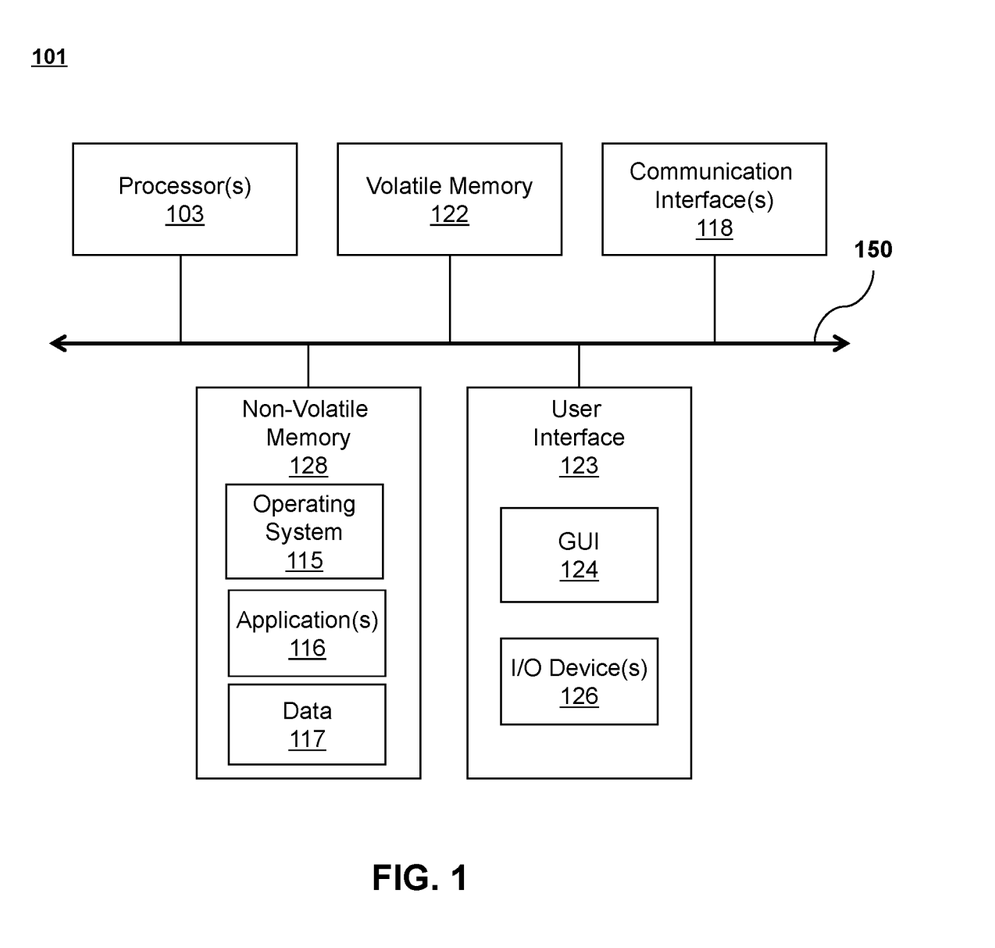
FIG. 1 is a block diagram of a network computing system, in accordance with an illustrative embodiment.

As shown in FIG. 1, computer 101 may include one or more processors 103, volatile memory 122 (e.g., random access memory (RAM)), non-volatile memory 128 (e.g., one or more hard disk drives (HDDs) or other magnetic or optical storage media, one or more solid state drives (SSDs)

such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.). Non-volatile memory 128 stores operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computer 101 may communicate via one or more communication buses, shown as communication bus 150.

Computer 101 as shown in FIG. 1 is shown merely as an example, as clients, servers, intermediary and other networking devices and may be implemented by any computing or processing environment and with any type of machine or set of machines that may have suitable hardware and/or software capable of operating as described herein. Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 118 may include one or more interfaces to enable computer 101 to access a computer network such as a Local Area Network (LAN), a Wide Area Network (WAN), a Personal Area Network (PAN), or the Internet through a variety of wired and/or wireless or cellular connections.

In described embodiments, the computing device 101 may execute an application on behalf of a user of a client computing device. For example, the computing device 101 may execute a virtual machine, which provides an execution session within which applications execute on behalf of a user or a client computing device, such as a hosted desktop session. The computing device 101 may also execute a terminal services session to provide a hosted desktop environment. The computing device 101 may provide access to a computing environment including one or more of: one or more applications, one or more desktop applications, and one or more desktop sessions in which one or more applications may execute.

B. Systems and Methods for Anomaly Detection and Root Cause Analysis

The following disclosure is directed to systems and methods for anomaly detection and root cause analysis. Specifically, the systems and methods described herein are configured to determine the root cause(s) of anomalous data sample(s) identified by an unsupervised multivariate detection system. The systems and methods described herein are configured to rank such root cause(s) based on their relative importance(s). While described herein in the context of User and Entity Behavior Analytics (UEBA), the systems and methods described herein may be applied across various other applications of anomaly detection.

UEBA may be or include the process of collecting and analyzing data regarding user or entity behavior, and applying machine learning and/or statistical analysis (mainly, unsupervised anomaly detection techniques) to detect anomalies that could indicate potential threats, risks or other scenarios. The machine learning and/or statistical analysis may detect anomalies by identifying unusual, inconsistent, outlier, or other inconsistent instances in which data does not conform to expected data.

Some implementations of UEBA systems may leverage univariate anomaly detection algorithms. In such implementations, the univariate anomaly detection algorithms can analyze each metric or feature of a data sample independently from the rest of the metrics. In this regard, the univariate anomaly detection algorithms detect anomalous observations separately for each metric or feature without considering possible correlations between other metric(s) or feature(s). The detected anomalous observations are then combined post hoc using a heuristic approach to produce, detect, or otherwise identify "multivariate" anomalies. However, such univariate approach has significant limitations, as such an approach considers each feature separately, as opposed to identifying anomalies where two (or more) features, in combination, are anomalous (e.g., a multivariate anomaly).

One reason a UEBA system may implement a univariate approach, as opposed to leveraging unsupervised multivariate anomaly detection techniques, is that the simplistic combination of the individual anomalies makes it trivial to interpret the "multivariate" anomalies. Thus, such implementations rely on pinpointing individual features in a data sample that were anomalous and which individual features were not anomalous, rather than viewing the totality of features. While such implementations may be computationally easier than a multivariate approach, such implementations have a cost in decreased accuracy in identifying multivariate anomalies. In some embodiments, as discussed herein, anomaly detection systems may leverage learning techniques (such as artificial intelligence, machine learning, deep learning, neural networks, etc.) to achieve better performance in anomaly detection. These techniques may implement a multivariate approach whereby multiple input features of a dataset are analyzed in parallel to detect anomalous observations. While the anomaly detection systems (e.g., which implement learning techniques) may achieve better performance than univariate anomaly detection systems, they may pose difficulties in root cause analysis (RCA). In some embodiments, the anomaly detection system may pose difficulties in RCA because, for instance, the system may consider multiple input features in parallel, the model (or combination of models) may not provide any intrinsic indications regarding the underlying reasons that a certain observation was regarded as anomalous or not, and the internals of the algorithms themselves may be complicated and such models are often likened to "black-box" solutions.

According to implementations of the present disclosure, a root cause analyzer receives data samples input to an anomaly detection engine, and corresponding anomaly labels output from the anomaly detection engine. The root cause analyzer trains a classification model using the data samples and the corresponding anomaly labels. The root cause analyzer determines, using the trained classification model and the plurality of data samples, relative contributions of anomalous features in a data sample of the plurality of data samples, to a prediction that the data sample is anomalous. The root cause analyzer provides the relative contributions of anomalous features to a device, to determine an action in response to the prediction that the data sample is anomalous.

The systems and methods described herein have many benefits over other potential implementations of anomaly detection and root cause analysis systems. For instance, by implementing a more holistic approach which identifies a broader range of anomalies and, correspondingly, indicating anomalous features in various data samples, the systems and methods described herein may increase user trust in the anomaly detection. Furthermore, by indicating anomalous features in various data samples, the systems and methods described herein assist users in decision-making based on specific anomalies identified in such data samples. Through explaining anomalous features in various data samples, such explanations may provide insight and understanding of improvements to the anomaly detection engine and, generally speaking, the process which is being modeled. Various other benefits will become apparent as followed.

Figure 2:
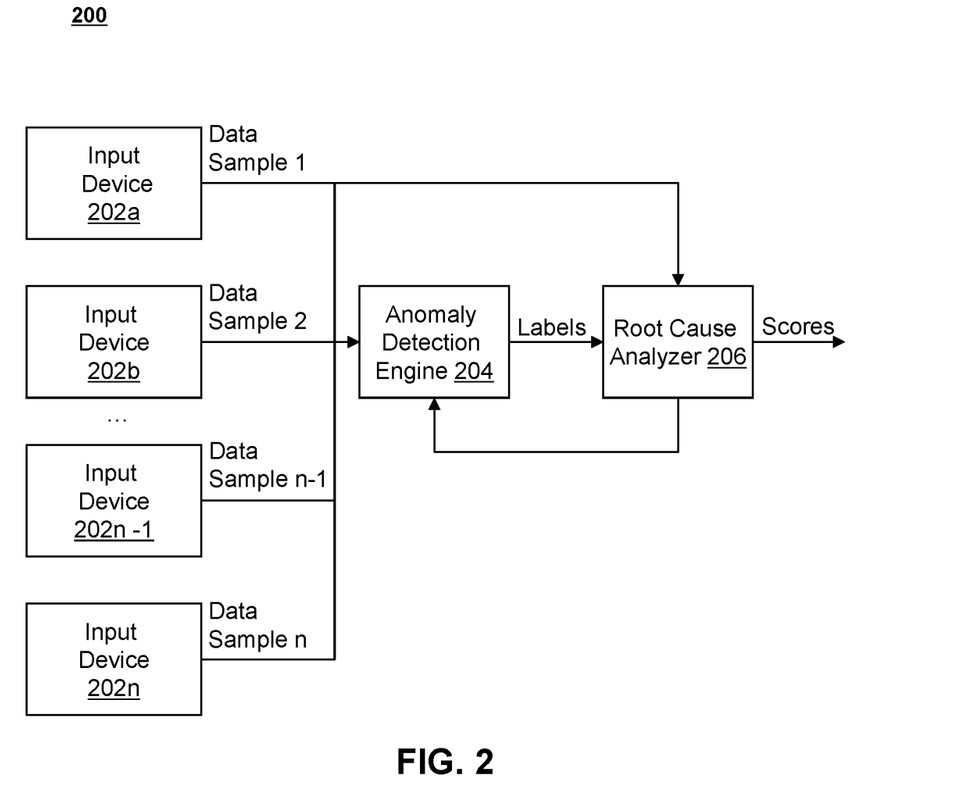
FIG. 2 is a block diagram of a system for anomaly detection and root cause analysis, in accordance with an illustrative embodiment.

Referring now to FIG. 2, depicted is a system 200 for anomaly detection and root cause analysis, according to an implementation of the present disclosure. The system 200 may include one or more input device(s) 202, an anomaly detection engine 204, and a root cause analyzer 206. The input device(s) 202 may be configured to generate data samples corresponding to monitored network or environment conditions, inputs, collected data, etc. Each data sample may include a number of features (e.g., characteristic(s), parameter(s), measurement(s), description(s), properties, value(s), condition(s)). The input device(s) 202 may be configured to provide the data samples to an anomaly detection engine 204, which processes, parses, or otherwise analyzes the data samples to detect anomalous data samples. The anomaly detection engine 204 may be configured to generate anomaly labels corresponding to the data samples. The root cause analyzer 206 may be configured to receive the data samples and corresponding anomaly labels output from the anomaly detection engine 204. The root cause analyzer 206 may be configured to train a classification model using the data samples and corresponding anomaly labels. The root cause analyzer 206 may be configured to generate scores indicative of anomalous features in the data sample(s) using the trained classification model and the data samples.

The systems and methods of the present solution may be implemented in any type and form of device, including clients, servers and/or appliances described above with reference to FIG. 1. For instance, the root cause analyzer 206 may be implemented at a server. The anomaly detection engine 204 may also be implemented at a server (which may be the same as the server which implements the root cause analyzer 206, or a different server). In some embodiments, the input device(s) 202 may be implemented at an intermediary device (e.g., arranged intermediary to the server(s) implementing the root cause analyzer 206 and/or anomaly detection engine 204, and a plurality of respective clients). The input device(s) 202 may be include or correspond to a plurality of clients. In some embodiments, a plurality of clients may each be in communication with, or monitored by a respective input device 202. The input device 202 may be in communication with, or monitored by the anomaly detection engine 204 and/or root cause analyzer 206. The input device(s) 202, anomaly detection engine 204, and/or root cause analyzer 206 may include or incorporate components and devices similar in some aspects to those described above with reference to FIG. 1, such as a memory and/or one or more processors operatively coupled to the memory. The present systems and methods may be implemented in any embodiments or aspects of the appliances or devices described herein.

The system 200 is shown to include a plurality of input devices 202. In some embodiments, there may only be a single input device 202 providing the data samples. Each input device 202 may be associated with a group of clients. The clients may be located on the same network, associated with the same enterprise, etc. The input device 202 may be configured to monitor, track, detect, collect or otherwise identify various analytics, features, or other statistics for an environment or application, such as network conditions and actions corresponding to the clients in a network environment. In some implementations, the input devices 202 may be associated with a user/entity behavior analytics (UEBA) system. As such, the input device 202 may be configured to collect and/or provide metrics, features, key performance indicators (KPIs), or other analytics corresponding to a user or other entity's behavior on for instance a client device on a network. Some examples of analytics which may be associated with a UEBA system can include desktop events, folder creation events, session events, file upload events, file download events, total events, overlapping sessions, and/or other similar statistics.

The input devices 202 may be configured to construct, assemble, compile, or otherwise generate a data sample including a plurality of features. In some implementations, the data sample may be unique to a particular user or entity (e.g., application, program, file, resource, processor, network node, computing device, or group of any of the foregoing). In such an implementation, the data sample for a particular user or entity may include features for that user or entity. In some implementations, the data sample may be unique to a particular network. In such an implementation, the data sample for a particular network may be a collection of features for a group of users or entities operating client devices on that network. In still other implementations, the data sample may be unique to a particular enterprise. In such an implementation, the data sample for a particular enterprise may be a collection of features for a group of users or entities within that enterprise. In these and other embodiments, a data sample may include a plurality of features. As shown in FIG. 2, each input device 202 may generate a corresponding data sample. The first input device 202*a* may generate a first data sample (e.g., data sample 1), the second input device 202*b* may generate a second data sample (e.g., data sample 2), etc. The input device(s) 202 may be configured to store the data samples. The input device(s) 202 may be configured to transmit, communicate, send, or otherwise provide the data samples to an anomaly detection engine 204. In some implementations, the input devices 202 may be configured to provide the data samples to both an anomaly detection engine 204 and a root cause analyzer 206.

The system 200 is shown to include an anomaly detection engine 204. The anomaly detection engine 204 may be or include any device, component, element, processor, circuitry, script, library, and/or combination of hardware and software designed or implemented to detect anomalous data samples. The anomaly detection engine 204 may be configured to receive data samples from the input device(s) 202. The anomaly detection engine 204 may be configured to parse the features within the data samples (either individually or in various combinations, orders, etc.) to identify anomalous data samples. In some embodiments, the anomaly detection engine 204 may be configured to implement or execute various anomaly detection algorithms. For instance, the anomaly detection engine 204 may implement an isolation forest anomaly detection algorithm, a one-class support vector machine anomaly detection algorithm, a local outlier factor anomaly detection algorithm, etc. In some embodiments, the anomaly detection engine 204 may combine two or more anomaly detection algorithms (e.g., the isolation forest one-class support vector machine anomaly detection algorithms, the isolation forest and local outlier factor anomaly detection algorithms, one-class support vector machine and local outlier factor anomaly detection algorithms, the isolation forest, one-class support vector machine, and/or the local outlier factor anomaly detection algorithms, etc.). Such embodiments may be combined to increase the confidence and accuracy of the anomaly detection engine 204. Hence, the anomaly detection engine 204 may include various models which combine one or a number of different anomaly detection algorithms.

Figure 3:
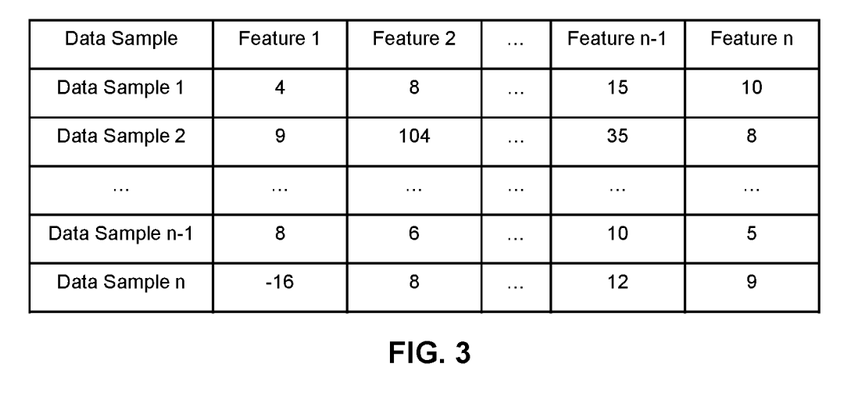
FIG. 3 shows a table including a plurality of data samples which may be provided to the system of FIG. 2, in accordance with an illustrative embodiment.
Figure 4:
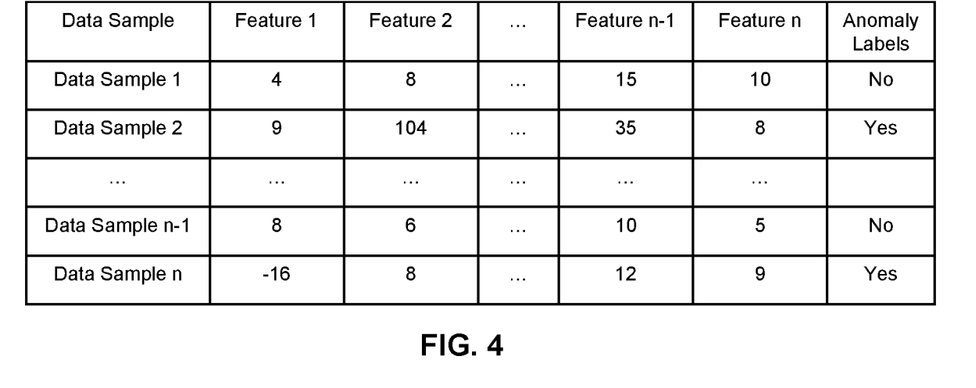
FIG. 4 shows the table of FIG. 3 having anomaly labels generated by the system of FIG. 2, in accordance with an illustrative embodiment.

Referring now to FIG. 2-FIG. 4, the anomaly detection engine 204 may be configured to generate anomaly labels for each of the data samples received by the anomaly detection engine 204 (e.g., from the input devices 202). Specifically, FIG. 3 shows a table including a plurality of data samples, and FIG. 4 shows the table of FIG. 3 having anomaly labels from the anomaly detection engine 204. The anomaly labels may be labels which are applied to the data samples to indicate whether the data sample is anomalous or not. In some instances, the data samples may be anomalous because of a single feature of the data sample. In other instances, the data samples may be anomalous because of a plurality of features of the data sample. In still other instances, the data samples may be anomalous because of a combination of features of the data sample (e.g., where individual features themselves may not be considered anomalous). The anomaly labels may be binary labels indicating whether the data samples are anomalous as shown in FIG. 4. The binary labels may be, for instance, a "Yes"/ "High"/"1"/"True" where the data sample is anomalous and a "No"/"Low"/"0"/"False" where the data sample is not anomalous (or vice versa). The anomaly labels may be scores that are transformable to binary labels. For instance, the scores may include a value of a likelihood of each feature in the data sample being anomalous. Each of the scores may correspond to a respective feature (or group of features) being anomalous. In this regard, the anomaly detection engine 204 may be configured to perform multivariate unsupervised anomaly detection on the data sample to generate the score(s). The anomaly detection engine 204 may be configured to compute an anomaly score corresponding to a likelihood that a data sample is anomalous responsive to analyzing the features in various combinations. The anomaly detection engine 204 may be configured to convert or transform the score to a binary label (e.g., by comparing the score to a threshold or range, for instance).

The system 200 is shown to include a root cause analyzer 206. The root cause analyzer 206 may be or include any device, component, element, circuitry, processor, script, library, and/or combination of hardware and software designed or implemented to detect a root cause of an anomaly. The root cause analyzer 206 may include, use, maintain, train or otherwise access a classification model. The classification model may be a model which is used for classifying whether particular data samples are anomalous (or not anomalous). The root cause analyzer 206 may include, use, maintain, or otherwise access an explainer platform (e.g., that incorporates or executes a SHAP algorithm, which uses the trained classification model and/or results/predictions from the classification model). The explainer platform may be designed and/or implemented to determine a contribution (e.g., a score) of a feature of a data sample to a prediction that the data sample is anomalous. As described above, the feature(s) which cause the data sample to be predicted as anomalous may include an individual feature which cause the data sample to be anomalous, a combination of features which cause the data sample to be anomalous, a plurality of features which individually cause the data sample to be anomalous, etc. As described in greater detail below, the root cause analyzer 206 (e.g., via the explainer platform and/or root cause analyzer 206) may be configured to receive data samples, train the classification model with the data samples, and apply the trained classification model to the data samples to generate predictions, as well as scores of features of the data samples.

The root cause analyzer 206 may be configured to receive data samples and corresponding anomaly labels. In some embodiments, the root cause analyzer 206 may receive the data samples and corresponding anomaly labels directly from the anomaly detection engine 204. In some embodiments, the root cause analyzer 206 may receive the data samples from the input devices 202, and the anomaly labels corresponding to those data samples from the anomaly detection engine 204. In these and other embodiments, the root cause analyzer 206 may be configured to receive the data samples and anomaly labels for training the classification model, and applying the trained classification model to the data samples to determine which feature(s) of the data samples contribute to, are attributable to, or otherwise cause the data sample to be anomalous.

The root cause analyzer 206 may be configured to train the classification model using the data samples and corresponding anomaly labels received (e.g., from the input device(s) 202, from the anomaly detection engine 204, etc.). The root cause analyzer 206 may tune, configure and/or optimize the classification model using the data samples received from the input device(s) 202. The root cause analyzer 206 may tune, configure and/or optimize the classification model using sample data samples. The root cause analyzer 206 may tune the classification model using historical data samples (e.g., previously received from the input device(s) 202).

In some embodiments, the classification model may use, include, or otherwise implement gradient boosted decision tree(s). The gradient boosted decision trees may be a form of machine learning which predicts a likelihood of a particular outcome based on various possible variables. The root cause analyzer 206 may be configured to train, adjust, or otherwise tune hyper-parameters for the gradient boosted decision trees using the data samples and corresponding anomaly labels. By tuning hyper-parameters for the gradient boosted decision trees, the root cause analyzer 206 may refine the classification model to improve the processing time and/or accuracy of predicting which of the feature(s) cause the data sample to be anomalous. In some embodiments, the root cause analyzer 206 may optimize the tuned hyper-parameters using Tree-structured Parzen Estimators (TPEs). The TPEs may sequentially construct, update, modify, or otherwise refine models (such as the tuned gradient boosted decision trees), and can approximate the performance of hyperparameters based on historical measurements. The TPEs may correspondingly select, update, or otherwise modify the hyperparameters to test based on such models. Accordingly, the root cause analyzer 206 may update, modify, train, or otherwise tune the classification model using feedback between hyper-parameters of gradient boosted decision trees and TPEs.

Figure 5:
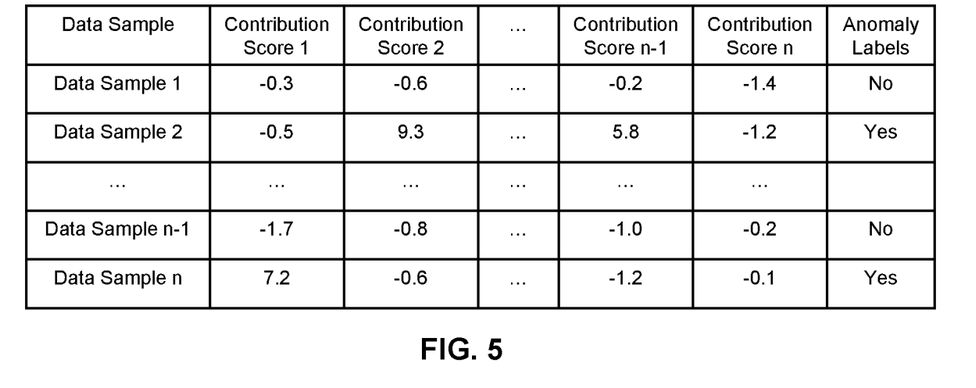
FIG. 5 depicts a table including contributions from features in each data sample included in the table of FIG. 4, in accordance with an illustrative embodiment.

Referring now to FIG. 1 and FIG. 4-FIG. 5, the root cause analyzer 206 may be configured to determine relative contributions of anomalous feature(s) in a data sample. FIG. 5 depicts contribution scores of the features for the data samples of FIG. 4. In some embodiments, the root cause analyzer 206 may be configured to determine relative contributions (e.g., of anomalous feature(s) in the data samples) to a prediction that the data sample is anomalous. In some embodiments, the root cause analyzer 206 may be configured to generate, compute, or otherwise determine a contribution score for each feature of a data sample, with each contribution score corresponding to the feature contributing to the prediction that the data sample is anomalous. The root cause analyzer 206 (e.g., via the explainer platform) may be configured to compute contribution scores of the features for data samples using the classification model and the data sample(s) from the input device(s) 202. In this regard, the root cause analyzer 206 may be configured to both train the classification model with the features of data samples from the input device(s) 202, and compute contribution scores of the features for the same data samples using the trained classification model.

The root cause analyzer 206 (e.g., via the explainer platform) may be configured to determine relative contributions of anomalous features in the data sample by applying the trained classification model to the data sample. The classification model may perform supervised anomaly detection on the data sample to predict that the data sample is anomalous. The anomaly detection performed by the classification model may be supervised because the root cause analyzer 206 receives and/or uses an anomaly label from the anomaly detection engine 204.

The root cause analyzer 206 may be configured to determine that one or more features of the data sample cause the data sample to be predicted as anomalous. As shown in FIG. 3-FIG. 5, each data sample includes various features. The anomaly detection engine 204 may be configured to generate anomaly labels for each of the data samples (e.g., Data Sample 1-Data Sample n). As shown in FIG. 4, the anomaly detection engine 204 may be configured to generate anomaly labels indicating that Data Sample 1 and Data Sample n−1 are not anomalous. On the other hand, the anomaly detection engine 204 may be configured to generate anomaly labels indicating that Data Sample 2 and Data Sample n are anomalous. The root cause analyzer 206 may be configured to analyze the features of the data samples to determine which feature(s) (or which combination of features) are predicted to have caused the prediction that the data sample is anomalous.

As shown in FIG. 5, and in some embodiments, the root cause analyzer 206 may be configured to compute contribution scores for each of the features for a particular data sample. The contribution scores may be indicative of a likelihood that the corresponding feature contributed to or otherwise caused the data sample to be predicted as anomalous. The root cause analyzer 206 may be configured to compute the contribution scores using a shapely additive explanations (SHAP) algorithm. The SHAP algorithm may be or include an algorithm which computes SHAP values corresponding to relative importance of features in a data sample. The root cause analyzer 206 may apply the SHAP algorithm to the data sample(s) for computing the contribution scores. In other words, the contribution scores may be, include, or otherwise correspond to SHAP values. The SHAP algorithm may determine which features (e.g., which individual feature(s), which group of features individually, and/or which combination of features) contributed to the prediction that the data sample is anomalous. The SHAP algorithm may compute the SHAP values by comparing a predicted outcome (e.g., whether or not a data sample is anomalous) with a particular feature and a predicted outcome without the particular feature. The SHAP algorithm may change the order in which feature(s) are received by the classification model to determine whether the particular order of features affect the prediction from the classification model. As such, the SHAP algorithm may simulate a plurality of variations of occurrences of features, a plurality of variations of order of features, etc. to compare features of the data sample and corresponding anomalous predictions. The SHAP algorithm may output contribution scores for features based on such comparisons.

As shown in FIG. 5, the contribution scores for each of the features may be indicative of whether a particular feature is anomalous. For Data Sample 2, the root cause analyzer 206 may output contribution scores which are relatively high for Feature 2 and Feature n−1, as these two features were likely to have contributed to the prediction that the data sample is anomalous. On the other hand, the root cause analyzer 206 may output contribution scores which are relatively low for Feature 1 and Feature n, as these two features were determined to be normal or within normalcy ranges (e.g., not anomalous). In some instances, the contribution scores for Feature 2 and Feature n−1 may be relatively high because of the combination of the respective features (e.g., together these two features are anomalous, while on their own the two features are not anomalous). In some instances, the contribution scores for Feature 2 and Feature n−1 may be relatively high because, individually, these two features are anomalous. As such, the root cause analyzer 206 may be configured to perform multivariate analysis on the features to determine which feature(s) or combinations of features contribute to the prediction of the data sample being anomalous. For Data Sample n, the root cause analyzer 206 may output a contribution score which is relatively high for Feature 1, as this feature was likely to have contributed to the prediction that the data sample is anomalous. On the other hand, the root cause analyzer 206 may output contribution scores for the remaining features, as these features were determined (e.g., by the root cause analyzer 206) to be normal. Hence, data samples may be anomalous due to single features (as is the case with Data Sample n), or due to multiple features (as is the case in Data Sample 2) either alone or in combination.

Figure 6:
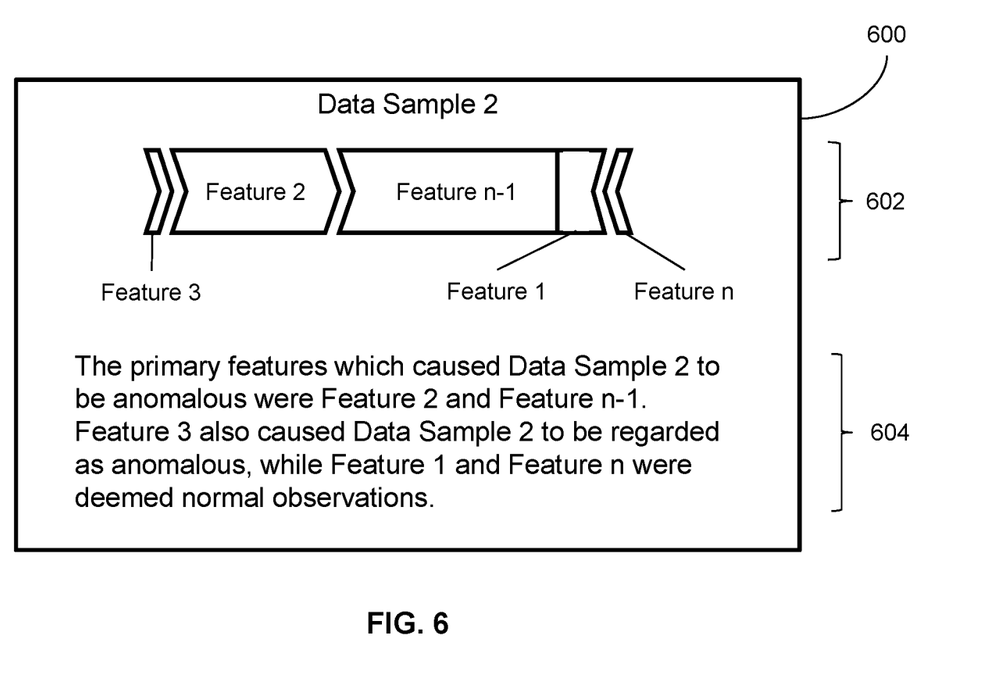
FIG. 6 depicts an example user interface showing a notification of contributions to a prediction that a data sample is anomalous, in accordance with an illustrative embodiment.

The root cause analyzer 206 may be configured to output, transmit, send, or otherwise provide relative contributions of anomalous features to a device. The device may be a device associated with a network administrator corresponding to particular input devices 202. In some implementations, the network administrator may review the relative contributions (e.g., from the root cause analyzer 206) and determine an action in response to the prediction that particular feature(s) are anomalous. In such implementations, the root cause analyzer 206 may generate and transmit a notification to the device. The notification may be similar to the table shown in FIG. 5, or include some of the data in the table. In some embodiments, the notification may be similar to the notification depicted in the user interface 600 of FIG. 6. Specifically, FIG. 6 depicts an example user interface 600 showing a notification of contributions of features to a prediction that Data Sample 2 is anomalous. The notification may include a graphical explanation 602 showing relative contributions of the features of Data Sample 2. The graphical explanation 602 may show which features contributed to the data sample being predicted as anomalous (e.g., Feature 3, Feature 2, and Feature n−1), and which features contributed to the data sample being predicted as not anomalous (e.g., Feature 1 and Feature n). The notification may include a textual explanation 604 which explains which features contributed to the data sample being predicted as anomalous, and which features contributed to the data sample being predicted as not anomalous.

The device receiving the notification may render the user interface 600 to the network administrator. The network administrator may interpret the notification to understand the cause(s) or nature of an anomaly, and/or determine an action to take based on the predictions. For instance, the network administrator may suspend network traffic to and from a particular client device. As another example, the network administrator may generate and send a notification to an employee or a supervisor indicating an anomalous behavior. As yet another example, the network administrator may shut down a particular server which is delivering content to a group of client devices. As still another example, the network administrator may determine that, while the data sample was predicted as anomalous, the data sample is not actually anomalous (which may be used as feedback for training the anomaly detection engine 204 and/or the root cause analyzer 206). In some embodiments, the device may automatically determine and/or take one or more of these actions (e.g., without feedback from a network administrator). In still other embodiments, the device may recommend one or more of these actions for approval by the network administrator. The network administrator may approve the recommended action(s) (e.g., via the device), and the device may take the recommended action(s).

Figure 7:
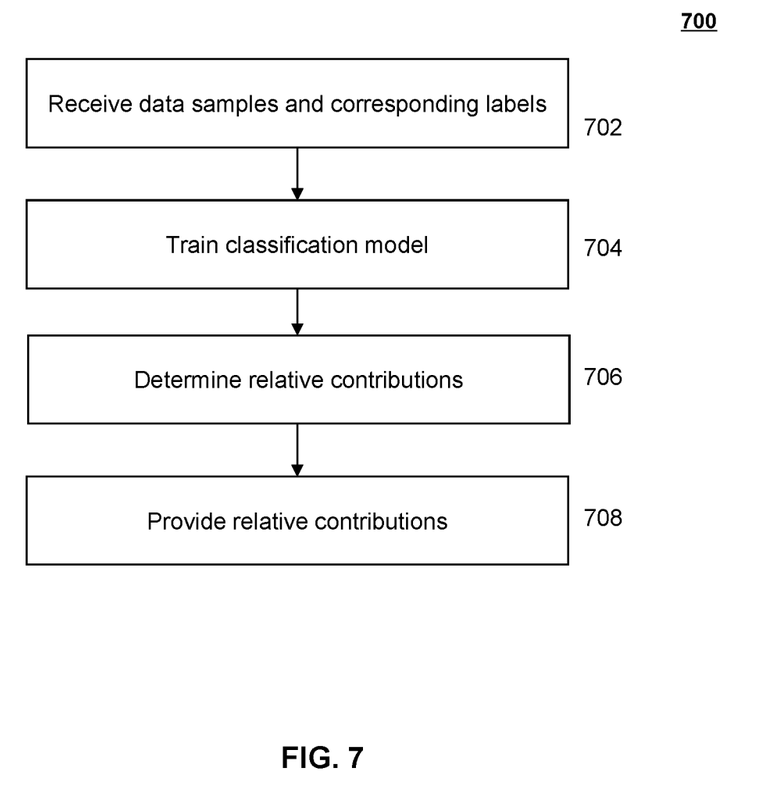
FIG. 7 is a flow chart showing a method for root cause analysis, in accordance with an illustrative embodiment.

Referring now to FIG. 7, an implementation of a method 700 for root cause analysis shall be described. In brief overview of method 700, at step 702, a root cause analyzer receives data samples and corresponding labels. At step 704, the root cause analyzer trains a classification model. At step 706, the root cause analyzer determines relative contributions. At step 708, the root cause analyzer provides the relative contributions.

At step 702, and in some embodiments, a root cause analyzer receives data samples and corresponding labels. In some embodiments, the root cause analyzer receives a plurality of data samples input to an anomaly detection engine and a corresponding plurality of anomaly labels output from the anomaly detection engine. The root cause analyzer may receive the data samples from the anomaly detection engine. The root cause analyzer may receive the data samples from an input device which provided the data samples to the anomaly detection engine. The root cause analyzer may receive the data samples responsive to the anomaly detection engine generating the corresponding anomaly labels. The root cause analyzer may receive the data samples prior to, while and/or after the anomaly detection engine generating the corresponding anomaly labels. In some embodiments, the anomaly detection engine may transmit, and the root cause analyzer may receive, the data samples together with the corresponding anomaly labels.

In some embodiments, the anomaly detection engine performs multivariate unsupervised anomaly detection to output the plurality of anomaly labels. The anomaly detection engine may perform multivariate unsupervised anomaly detection to detect anomalies in the data samples. The anomalies may be due to individual anomalous features of the data samples, combinations of anomalous features of the data samples, etc. In some embodiments, a particular data sample may include a multivariate anomaly attributable to a plurality of anomalous features. In this regard, while a single feature may itself not be anomalous, a feature in combination with other feature(s) may cause the data sample to be anomalous. The anomaly detection engine may analyze the data samples to determine which of the data samples are anomalous. The anomaly detection engine may generate, produce, or otherwise determine anomaly labels based on whether or not the data samples are anomalous.

In some embodiments, the anomaly labels may include binary labels or scores that are transformable to binary labels. The binary labels may be labels which indicate whether or not the corresponding data sample is anomalous (for instance, a "Yes"/"High"/"1"/"True" where the data sample is anomalous and a "No"/"Low"/"0"/"False" where the data sample is not anomalous (or vice versa)). The anomaly labels may be scores which are transformable to binary labels (e.g., by comparing the scores to a threshold, for instance). In these and other embodiments, the anomaly labels may be indicative of whether a corresponding data sample is anomalous. The root cause analyzer may receive the anomaly labels for the data samples. The root cause analyzer may use the anomaly labels to perform supervised analysis of the data samples, as described in greater detail below.

At step 704, and in some embodiments, the root cause analyzer trains a classification model. In some embodiments, the root cause analyzer trains the classification model using the plurality of data samples and the corresponding plurality of anomaly labels (e.g., received at step 702). The root cause analyzer may train the classification model with data samples which are both determined to be anomalous and determined to not be anomalous. In some embodiments, the root cause analyzer tunes hyper-parameters of the classification model prior to training the classification model using the data samples and corresponding anomaly labels. The hyper-parameters of the classification model may be parameters of a gradient boosted decision tree. The root cause analyzer may tune the hyper-parameters with feedback using tree of parzen estimators. Following tuning the hyper-parameters of the classification model, the root cause analyzer may train the classification model using the data samples and corresponding anomaly labels. The root cause analyzer may use the classification model to test, detect and/or determine which features of the data samples(s) contribute to data samples being labeled as anomalous. As described in greater detail below, the root cause analyzer may use the classification model for determining which features of a data sample contributed to the prediction of the data sample being anomalous.

The root cause analyzer may indicate or determine whether the data sample(s) are anomalous, for instance as discussed in step 702. The root cause analyzer may indicate or determine whether the data sample(s) are anomalous based on the corresponding anomaly label. For instance, the root cause analyzer may identify the data samples having anomaly labels indicating that the data samples are anomalous. The root cause analyzer may determine contributions of anomalous features in those data samples which are predicted to be anomalous, as described in greater detail below.

At step 706, and in some embodiments, the root cause analyzer determines relative contributions. In some embodiments, the root cause analyzer determines relative contributions of anomalous features in a data sample of the plurality of data samples (e.g., received at step 702) to a prediction that the data sample is anomalous. The root cause analyzer may determine the relative contributions using the trained classification model (e.g., trained at step 704), predictions from the trained classification model, and/or the plurality of data samples (e.g., received at step 702). The root cause analyzer may apply the trained classification model to the data samples (e.g., received at step 702, which are anomalous) to test, simulate and/or determine contributions of anomalous features in the data samples. In some embodiments, the root cause analyzer may compute a contribution score corresponding to features of the data samples predicted to be anomalous. The root cause analyzer may use a shapely additive explanations algorithm, the trained classification model, predictions from the trained classification model, and/or the plurality of data samples, to generate the scores indicative of the anomalous features in the data sample. The scores may indicate a relative importance of the corresponding features in contributing to or causing the prediction that the data sample is anomalous. For instance, where a particular feature is "normal" (e.g., not anomalous), the feature may have a relatively low contribution score because that feature is not important to the prediction that the data sample is anomalous. In instances in which a particular feature (either alone or in combination with other feature(s)) are anomalous, those feature(s) may have a relatively high contribution score because those features contributed to the prediction that the data sample is anomalous.

In some embodiments, the root cause analyzer may predict that the data sample is anomalous using the using the trained classification model and the plurality of data samples. In some embodiments, the root cause analyzer may use supervised anomaly detection to predict that a data sample is anomalous. The root cause analyzer may use the data samples and classification model to predict whether the data samples are anomalous, and use the corresponding anomaly labels as feedback and/or guidance. In this regard, the anomaly labels may function to supervise the anomaly detection performed by the root cause analyzer. The root cause analyzer may predict that the data sample is anomalous including (and/or without) particular features of the data sample. By selectively including particular features of the data sample, the root cause analyzer may determine which features are likely to contribute to the prediction that a data sample is anomalous. The root cause analyzer may compute scores indicating a likelihood that a particular feature (which is anomalous) contributed to the prediction that the data sample is anomalous. In this regard, a prediction that the data sample is anomalous may be (at least partially) attributable to a score of an anomalous feature in the data sample (e.g., generated by the root cause analyzer using the classification model).

At step 708, and in some embodiments, the root cause analyzer provides the (relative) contributions. In some embodiments, the root cause analyzer may provide the (relative) contributions of anomalous features to a device to determine an action in response to the prediction that the data sample is anomalous. The root cause analyzer may provide the (relative) contributions responsive to applying the classification model to the data sample(s) received at step 702. The root cause analyzer may provide the (relative) contributions to a device corresponding to a network administrator. The (relative) contributions may be included in a notification (e.g., as a table, as a graphical explanation of the contributions, a textual explanation of the contributions, etc.). The device may render the notification to the network administrator who may, correspondingly, determine an action in response to the prediction that the data sample is anomalous. In some embodiments, the root cause analyzer may provide the (relative) contributions to a device, which automatically determines one or more actions to take based on the prediction. In some embodiments, the root cause analyzer may provide the (relative) contributions to a device, which automatically recommends one or more actions to take based on the prediction, and the device may take the recommended action responsive to approval by a network administrator (e.g., via the device or on a separate device).

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

We claim:

1. A method comprising:
   receiving, by a root cause analyzer, a plurality of data samples input to an anomaly detection engine, and a corresponding plurality of anomaly labels output from the anomaly detection engine;
   training, by the root cause analyzer, a classification model using the plurality of data samples and the corresponding plurality of anomaly labels;
   determining, by the root cause analyzer using the trained classification model and the plurality of data samples, relative contributions of anomalous features in a data sample of the plurality of data samples;
   generating, by the root cause analyzer, a prediction that the data sample is anomalous;
   providing, by the root cause analyzer, the relative contributions of anomalous features to a device; and
   causing, by the root cause analyzer, the device to determine an action in response to the prediction that the data sample is anomalous.

2. The method of claim 1, wherein the anomaly detection engine performs multivariate unsupervised anomaly detection to output the plurality of anomaly labels.

3. The method of claim 1, wherein the plurality of anomaly labels comprises binary labels or scores that are transformable to binary labels.

4. The method of claim 1, wherein each of the plurality of anomaly labels is indicative of whether a corresponding data sample from the plurality of data samples is anomalous.

5. The method of claim 1, comprising predicting, by the root cause analyzer using the trained classification model and the plurality of data samples, that the data sample is anomalous.

6. The method of claim 5, comprising predicting, using supervised anomaly detection, that the data sample is anomalous.

7. The method of claim 1, wherein a prediction that the data sample is anomalous is attributable to a score of an anomalous feature in the data sample.

8. The method of claim 1, wherein the data sample comprises a multivariate anomaly attributable to the anomalous features indicated by the generated scores.

9. The method of claim 1, comprising using a shapely additive explanations algorithm, the trained classification model and the plurality of data samples, to generate the scores indicative of the anomalous features in the data sample.

10. The method of claim 1, further comprising tuning hyper-parameters of the classification model prior to training the classification model using the plurality of data samples and the plurality of anomaly labels.

11. A device comprising:
memory configured to store a plurality of data samples; and
at least one processor configured to implement a root cause analyzer to:
receive the plurality of data samples input to an anomaly detection engine, and a corresponding plurality of anomaly labels output from the anomaly detection engine;
train a classification model using the plurality of data samples and the corresponding plurality of anomaly labels;
determine, using the trained classification model and the plurality of data samples, relative contributions of anomalous features in a data sample of the plurality of data samples;
generate a prediction that the data sample is anomalous;
provide the relative contributions of anomalous features to a device; and
cause the device to determine an action in response to the prediction that the data sample is anomalous.

12. The device of claim 11, wherein the anomaly detection engine is configured to perform multivariate unsupervised anomaly detection to output the plurality of anomaly labels.

13. The device of claim 11, wherein the plurality of anomaly labels comprises binary labels or scores that are transformable to binary labels.

14. The device of claim 11, wherein each of the plurality of anomaly labels is indicative of whether a corresponding data sample from the plurality of data samples is anomalous.

15. The device of claim 11, wherein the root cause analyzer is configured to predict, using the trained classification model and the plurality of data samples, that the data sample is anomalous.

16. The device of claim 15, wherein the root cause analyzer is configured to predict, using supervised anomaly detection, that the data sample is anomalous.

17. The device of claim 11, wherein a prediction that the data sample is anomalous is attributable to a score of an anomalous feature in the data sample.

18. The device of claim 11, wherein the data sample comprises a multivariate anomaly attributable to the anomalous features indicated by the generated scores.

19. The device of claim 11, wherein the root cause analyzer is configured to generate the scores indicative of the anomalous features in the data sample, using a shapely additive explanations algorithm, the trained classification model and the plurality of data samples.

20. A non-transitory computer readable medium storing program instructions for causing one or more processors to:
receive a plurality of data samples input to an anomaly detection engine, and a corresponding plurality of anomaly labels output from the anomaly detection engine;
train a classification model using the plurality of data samples and the corresponding plurality of anomaly labels;
determine, using the trained classification model and the plurality of data samples, relative contributions of anomalous features in a data sample of the plurality of data samples;
generate a prediction that the data sample is anomalous;
provide the relative contributions of anomalous features to a device; and
cause the device to determine an action in response to the prediction that the data sample is anomalous.

* * * * *